(12) United States Patent
Dai

(10) Patent No.: US 11,431,880 B2
(45) Date of Patent: Aug. 30, 2022

(54) METHOD AND DEVICE FOR AUTOMATICALLY ADJUSTING SYNCHRONIZATION OF SOUND AND PICTURE OF TV, AND STORAGE MEDIUM

(71) Applicant: SHENZHEN SKYWORTH-RGB ELECTRONIC CO., LTD., Shenzhen (CN)

(72) Inventor: Yuming Dai, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/264,268

(22) PCT Filed: Aug. 31, 2020

(86) PCT No.: PCT/CN2020/112649
§ 371 (c)(1),
(2) Date: Jan. 28, 2021

(87) PCT Pub. No.: WO2021/103724
PCT Pub. Date: Jun. 3, 2021

(65) Prior Publication Data
US 2021/0392240 A1 Dec. 16, 2021

(30) Foreign Application Priority Data
Nov. 29, 2019 (CN) .......................... 201911216989.9

(51) Int. Cl.
*H04N 5/12* (2006.01)
*G10L 25/57* (2013.01)
*H04N 21/43* (2011.01)

(52) U.S. Cl.
CPC .............. *H04N 5/12* (2013.01); *G10L 25/57* (2013.01); *H04N 21/4307* (2013.01)

(58) Field of Classification Search
CPC ...... H04N 5/12; H04N 21/4307; H04N 17/04; H04N 21/43072; H04N 5/04; G10L 25/57
(Continued)

(56) References Cited

U.S. PATENT DOCUMENTS 5,387,943 A * 2/1995 Silver ...................... H04N 5/04
348/512
2009/0073316 A1 * 3/2009 Ejima .............. H04N 21/43632
348/515
(Continued)

FOREIGN PATENT DOCUMENTS

CN 101453655 A 6/2009
CN 103747316 A 4/2014
(Continued)

OTHER PUBLICATIONS

First Office Action issued in counterpart Chinese Patent Application No. 201911216989.9, dated Mar. 15, 2021.
(Continued)

*Primary Examiner* — Michael Lee
(74) *Attorney, Agent, or Firm* — Westbridge IP LLC

(57) ABSTRACT

Disclosed is a method for automatically adjusting synchronization of sound and picture of TV. The method includes: obtaining a video, determining whether the video contains an adjustment video clip corresponding to a preset video database; obtaining audio information of the adjustment video clip and a time point corresponding to the audio information if the video contains the adjustment video clip corresponding to the preset video database; comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the
(Continued)

sound and the picture. A device for automatically adjusting synchronization of sound and picture of TV and a computer readable storage medium are further disclosed.

10 Claims, 6 Drawing Sheets

(58) Field of Classification Search
USPC .......................................................... 348/500
See application file for complete search history.

(56) References Cited

U.S. PATENT DOCUMENTS

| | | | | |
|---|---|---|---|---|
| 2010/0315553 | A1* | 12/2010 | Takatsuji | G09G 5/006 348/516 |
| 2011/0013085 | A1* | 1/2011 | Kulyk | H04N 21/4341 348/520 |
| 2011/0052136 | A1* | 3/2011 | Homan | H04N 21/242 386/201 |
| 2014/0376873 | A1* | 12/2014 | Tanaka | H04N 5/44513 386/203 |
| 2016/0316109 | A1* | 10/2016 | Cooper | H04N 5/06 |

FOREIGN PATENT DOCUMENTS

| | | |
|---|---|---|
| CN | 105898500 A | 8/2016 |
| CN | 105898502 A | 8/2016 |
| CN | 109379613 A | 2/2019 |
| CN | 110324689 A | 10/2019 |
| CN | 110971783 A | 4/2020 |
| JP | 2017103542 A | 6/2017 |
| WO | 2015174753 A1 | 11/2015 |

OTHER PUBLICATIONS

International Search Report and Written Opinion issued in corresponding PCT Application No. PCT/CN2020/112649, dated Nov. 11, 2020.
Supplementary European Search Report issued in counterpart European Patent Application No. 20845553.5, dated Mar. 11, 2022.
Third Office Action issued in counterpart Chinese Patent Application No. 201911216989.9, dated Feb. 25, 2022.

* cited by examiner

METHOD AND DEVICE FOR AUTOMATICALLY ADJUSTING SYNCHRONIZATION OF SOUND AND PICTURE OF TV, AND STORAGE MEDIUM

CROSS-REFERENCE TO RELATED APPLICATIONS

This application is a National Stage of International Application No. PCT/CN2020/112649, filed on Aug. 31, 2020, which claims priority to Chinese Application No. 201911216989.9, filed on Nov. 29, 2019, filed with China National Intellectual Property Administration, and entitled "METHOD AND DEVICE FOR AUTOMATICALLY ADJUSTING SYNCHRONIZATION OF SOUND AND PICTURE OF TV, AND STORAGE MEDIUM", the entire disclosure of which is incorporated herein by reference.

TECHNICAL FIELD

The present disclosure relates to the technical field of televisions (TVs), and in particular to a method and a device for automatically adjusting synchronization of sound and picture of TV, and a computer readable storage medium.

BACKGROUND

Nowadays, with the development of TV and the popularization of Internet TV, frequency sources for video playback on TV are becoming increasingly diverse, and more and more external devices are installed, such as Bluetooth speakers and voice remote controls.

However, due to the increasing variety of frequency sources for video playback on TV, the audio synchronization adjustment for a channel when the TV leaves the factory cannot meet the requirements of all channel frequency sources, the video played by some channel frequency sources has the phenomenon that the sound is not in synchronization with the picture. Especially when the audio is played by the external device (such as the Bluetooth speaker), the phenomenon of sound and picture out of synchronization is particularly obvious, causing a bad viewing experience for users.

SUMMARY

The main objective of the present disclosure is to provide a method and a device for automatically adjusting synchronization of sound and picture of TV, and a computer readable storage medium, which aims to enable TVs with different channels and different frequency sources to automatically adjust sound and picture during the playback process.

In order to achieve the above objective, the present disclosure provides a method for automatically adjusting synchronization of sound and picture of TV, including the following operations:

obtaining a video, and determining whether the video contains an adjustment video clip corresponding to a preset video database;

obtaining audio information of the adjustment video clip and a time point corresponding to the audio information if the video contains the adjustment video clip corresponding to the preset video database;

comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the sound and the picture.

In an embodiment, after the operation of obtaining a video, and determining whether the video contains an adjustment video clip corresponding to a preset video database, the method further includes:

receiving user's instruction for automatically adjusting synchronization of the sound and the picture if the video does not contain the adjustment video clip corresponding to the preset video database; and inserting a preset default video into the video according to the instruction, and obtaining audio information of the preset default video and a corresponding time point.

In an embodiment, the operation of obtaining a video, and determining whether the video contains an adjustment video clip corresponding to a preset video database includes:

obtaining preview information of the video or a short video in film source information; and comparing the short video with the preset video database, and determining whether the video contains the adjustment video clip corresponding to the preset video database according to a comparison result.

In an embodiment, the operation of obtaining audio information of the adjustment video clip and a time point corresponding to the audio information includes:

determining whether the adjustment video clip is being played according to the video; and collecting audio information of the adjustment video clip being played, and recording a collection time point, if the adjustment video clip is being played.

In an embodiment, the operation of collecting audio information of the adjustment video clip being played, and recording a collection time point includes:

determining whether the audio information of the adjustment video clip is collected by an external microphone according to the adjustment video clip; and recording and collecting the audio information of the adjustment video clip through the external microphone, and recording the collection time point, if the audio information of the adjustment video clip is collected by the external microphone.

In an embodiment, the operation of collecting audio information of the adjustment video clip being played, and recording a collection time point includes:

determining whether the audio information of the adjustment video clip is collected by an internal microphone according to the adjustment video clip;

recording and collecting the audio information of the adjustment video clip through the internal microphone, and recording the collection time point, if the audio information of the adjustment video clip is collected by the internal microphone; and recording and collecting the audio information of the adjustment video clip through an external microphone, and recording the collection time point, if the audio information of the adjustment video clip is not collected by the internal microphone.

In an embodiment, the operation of comparing the audio information of the adjustment video clip and the time point corresponding to the audio information with a standard video in the preset video database, and determining whether there is a synchronization delay between the sound and the picture further includes:

skipping to synchronize the sound and the picture of the video if there is no synchronization delay between the sound and the picture.

In an embodiment, the operation of synchronizing the sound and the picture of the video includes:

calculating according to the audio information of the adjustment video clip and the time point corresponding to the audio information and the standard video in the preset video database, and obtaining calculated sound and picture synchronization delay data; and synchronizing the sound and the picture of the video according to the sound and picture synchronization delay data.

In an embodiment, the operation of synchronizing the sound and the picture of the video according to the sound and picture synchronization delay data includes:

obtaining a sound and picture synchronization offset value of the video according to the sound and picture synchronization delay data; and synchronizing the sound and the picture of the video according to a sound and picture synchronization parameter corresponding to the sound and picture synchronization offset value.

Besides, in order to achieve the above objective, the present disclosure provides a device for automatically adjusting synchronization of sound and picture of TV, the device includes a memory, a processor, and a program for automatically adjusting synchronization of sound and picture of TV stored in the memory and executed by the processor, the program, when executed by the processor, performs the method for automatically adjusting synchronization of sound and picture of TV as described above.

Besides, in order to achieve the above objective, the present disclosure provides a computer readable storage medium, the computer readable storage medium stores a program for automatically adjusting synchronization of sound and picture of TV, the program, when executed by a processor, performs the method for automatically adjusting synchronization of sound and picture of TV as described above.

The present disclosure provides a method and a device for automatically adjusting synchronization of sound and picture of TV, and a computer readable storage medium. The method includes: obtaining a video, and determining whether the video contains an adjustment video clip corresponding to a preset video database; obtaining audio information of the adjustment video clip and a time point corresponding to the audio information if the video contains the adjustment video clip corresponding to the preset video database; comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the sound and the picture. As such, when playing a specific adjustment video clip, the adjustment video clip is compared with the preset database. According to the comparison result, the synchronization of the sound and the picture of the video are automatically adjusted without the user's perception, which improves the user's viewing experience, without the user's subjective interaction and repeated adjustments, and has high adjustment accuracy.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

Figure 1:
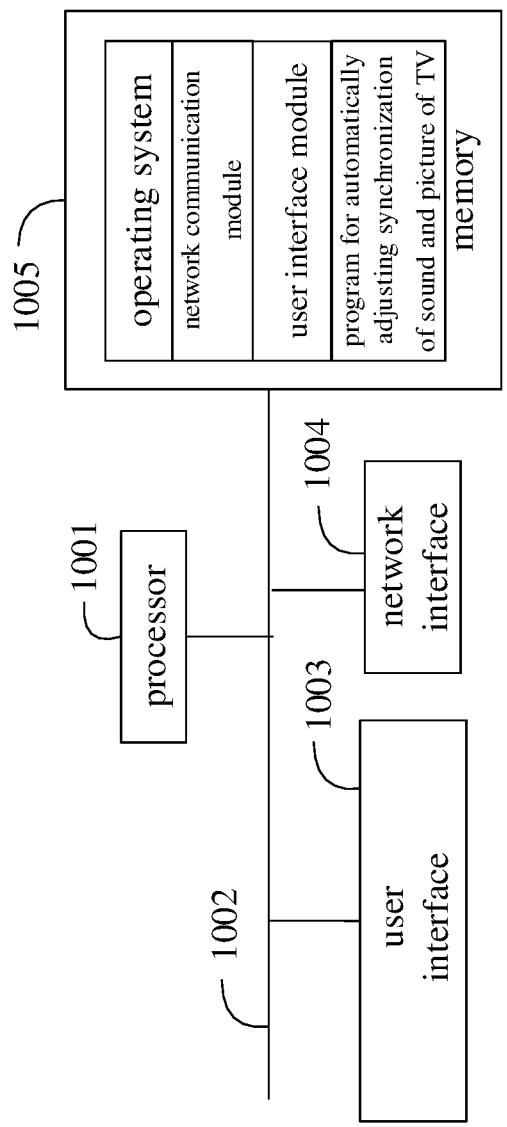
FIG. 1 is a schematic structural diagram of a device of hardware operating environment according to an embodiment of the present disclosure.

As shown in FIG. 1, FIG. 1 is a schematic structural diagram of a device of hardware operating environment according to an embodiment of the present disclosure.

A terminal of the embodiment of the present disclosure can be a PC, or a terminal device with data processing functions such as a smart phone, a tablet computer, and a portable computer.

As shown in FIG. 1, the terminal may include a processor 1001, such as a CPU, a network interface 1004, a user interface 1003, a memory 1005, and a communication bus 1002. The communication bus 1002 is configured to implement connection and communication between the components. The user interface 1003 may include a display, an input unit such as a keyboard. The user interface 1003 may also include a standard wired interface and a wireless interface. The network interface 1004 may further include a standard wired interface and a wireless interface (such as a WI-FI interface). The memory 1005 may be a high-speed random access memory (RAM) or a non-volatile memory, such as a magnetic disk memory. The memory 1005 may also be a storage device independent of the foregoing processor 1001.

In an embodiment, the terminal may also include a camera, a Radio Frequency (RF) circuit, a sensor, an audio circuit, a WiFi module, and so on. The sensors may be, for example, a light sensor, a motion sensor, and other sensors. Specifically, the light sensor may include an ambient light sensor and a proximity sensor. The ambient light sensor may adjust the brightness of the display according to the brightness of the ambient light. The proximity sensor may turn off the display and/or the backlight when the mobile terminal is moved to the ear. A gravity acceleration sensor, as a kind of motion sensor, may detect the magnitude of acceleration in various directions (usually three axes). The gravity acceleration sensor may detect the magnitude and direction of gravity when it is stationary, and may be configured to identify the gesture of the mobile terminal (such as horizontal and vertical screen switching, related games, magnetometer attitude calibration), vibration recognition related functions (such as pedometer, tap), etc. Of course, the mobile terminal may also be configured with other sensors such as a gyroscope, a barometer, a hygrometer, a thermometer, an infrared sensor, and the like, which will not be repeated here.

Those skilled in the art should understand that the terminal structure shown in FIG. 1 does not constitute a limitation on the terminal, and may include more or fewer components, a combination of some components, or differently arranged components than shown in the figure.

As shown in FIG. 1, the memory 1005, as a computer storage medium, may include an operating system, a network communication module, a user interface module, and a program for automatically adjusting synchronization of sound and picture of TV.

In the terminal shown in FIG. 1, the network interface 1004 is mainly configured to connect to a background server and perform data communication with the background server. The user interface 1003 is mainly configured to connect to a client (user) and perform data communication with the client. The processor 1001 may be configured to call the program for automatically adjusting synchronization of sound and picture of TV stored in the memory 1005, and perform the following operations:

obtaining a video, and determining whether the video contains an adjustment video clip corresponding to a preset video database;

obtaining audio information of the adjustment video clip and a time point corresponding to the audio information if the video contains the adjustment video clip corresponding to the preset video database;

comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the sound and the picture.

Further, the processor 1001 may call the program for automatically adjusting synchronization of sound and picture of TV stored in the memory 1005, and further perform the following operations:

after the operation of determining whether the video contains an adjustment video clip corresponding to a preset video database, further includes:

receiving user's instruction for automatically adjusting synchronization of the sound and the picture if the video does not contain the adjustment video clip corresponding to the preset video database; and inserting a preset default video into the video according to the instruction, and obtaining audio information of the preset default video and a corresponding time point.

Further, the processor 1001 may call the program for automatically adjusting synchronization of sound and picture of TV stored in the memory 1005, and further perform the following operations:

the operation of determining whether the video contains an adjustment video clip corresponding to a preset video database includes:

obtaining preview information of the video or a short video in film source information; and comparing the short video with the preset video database, and determining whether the video contains the adjustment video clip corresponding to the preset video database according to a comparison result.

Further, the processor 1001 may call the program for automatically adjusting synchronization of sound and picture of TV stored in the memory 1005, and further perform the following operations:

the operation of obtaining audio information of the adjustment video clip and a time point corresponding to the audio information includes:

determining whether the adjustment video clip is being played according to the video; and collecting audio information of the adjustment video clip being played, and recording a collection time point, if the adjustment video clip is being played.

Further, the processor 1001 may call the program for automatically adjusting synchronization of sound and picture of TV stored in the memory 1005, and further perform the following operations:

the operation of collecting audio information of the adjustment video clip being played, and recording a collection time point includes:

determining whether the audio information of the adjustment video clip is collected by an external microphone according to the adjustment video clip; and recording and collecting the audio information of the adjustment video clip through the external microphone, and recording the collection time point, if the audio information of the adjustment video clip is collected by the external microphone.

Furthermore, in another embodiment, the operation of collecting audio information of the adjustment video clip being played, and recording a collection time point includes:

determining whether the audio information of the adjustment video clip is collected by an internal microphone according to the adjustment video clip;

recording and collecting the audio information of the adjustment video clip through the internal microphone, and recording the collection time point, if the audio information of the adjustment video clip is collected by the internal microphone; and recording and collecting the audio information of the adjustment video clip through an external microphone, and recording the collection time point, if the audio information of the adjustment video clip is not collected by the internal microphone.

Further, the processor 1001 may call the program for automatically adjusting synchronization of sound and picture of TV stored in the memory 1005, and further perform the following operations:

the operation of comparing the audio information of the adjustment video clip and the time point corresponding to the audio information with a standard video in the preset video database, and determining whether there is a synchronization delay between the sound and the picture further includes:

skipping to synchronize the sound and the picture of the video if there is no synchronization delay between the sound and the picture.

Further, the processor 1001 may call the program for automatically adjusting synchronization of sound and picture of TV stored in the memory 1005, and further perform the following operations:

the operation of synchronizing the sound and the picture of the video includes:

calculating according to the audio information of the adjustment video clip and the time point corresponding to the audio information and the standard video in the preset video database, and obtaining calculated sound and picture synchronization delay data; and synchronizing the sound and the picture of the video according to the sound and picture synchronization delay data.

Further, the processor 1001 may call the program for automatically adjusting synchronization of sound and picture of TV stored in the memory 1005, and further perform the following operations:

the operation of synchronizing the sound and the picture of the video according to the sound and picture synchronization delay data includes:

obtaining a sound and picture synchronization offset value of the video according to the sound and picture synchronization delay data; and synchronizing the sound and the picture of the video according to a sound and picture synchronization parameter corresponding to the sound and picture synchronization offset value.

The specific embodiments of the device for automatically adjusting synchronization of sound and picture of TV of the present disclosure are basically the same as the following embodiments of the method for automatically adjusting synchronization of sound and picture of TV, and will not be repeated here.

Figure 2:
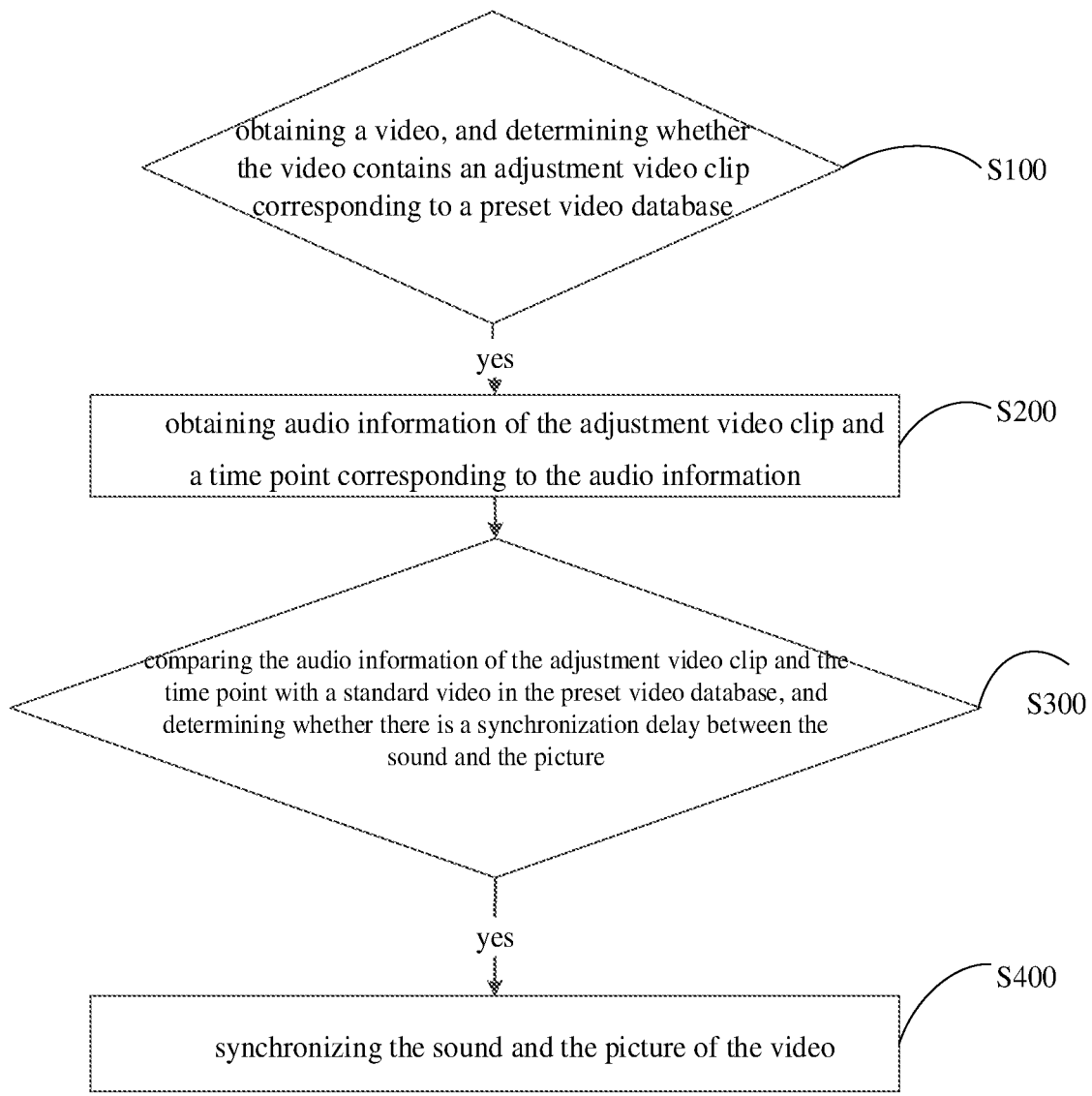
FIG. 2 is a schematic flow diagram of a method for automatically adjusting synchronization of sound and picture of TV according to a first embodiment of the present disclosure.

As shown in FIG. 2, FIG. 2 is a schematic flow diagram of a method for automatically adjusting synchronization of sound and picture of TV according to a first embodiment of the present disclosure. The method for automatically adjusting synchronization of sound and picture of TV includes:

Operation S100, obtaining a video, and determining whether the video contains an adjustment video clip corresponding to a preset video database.

In this embodiment, in the playback preparation stage or preview stage of the video or the film source, the video to be played is obtained, and it is determined whether the video contains an adjustment video clip corresponding to the preset video database according to the video. The preset video database is a basic starting video database according to the current mainstream film source and the video. These data can come from, but not limited to, the starting videos of the film sources of the blockbuster production companies, the opening songs of the TV series, and the starting videos of the special film sources (such as the pre-broadcast videos of sports such as football). The preset video database may be a database that is updated in real time according to the adaptation situation on the market. It can be determined whether the video contains an adjustment video clip corresponding to the preset video database by comparing the first short video in the obtained video with the specific video information pre-made in the preset video database. If the two match, it means that the video contains the adjustment video clip corresponding to the preset video database. Alternatively, it can be determined whether the video contains an adjustment video clip corresponding to the preset video database by comparing the video clip in the film source information of the obtained video with the specific video information pre-made in the preset video database. If the two match, it means that the video contains the adjustment video clip corresponding to the preset video database.

If the video contains the adjustment video clip corresponding to the preset video database, perform operation S200, obtaining audio information of the adjustment video clip and a time point corresponding to the audio information.

The audio information of the adjustment video clip and the time point corresponding to the audio information are obtained if the video contains the adjustment video clip corresponding to the preset video database. Specially, the corresponding adjustment video clip can be played. The audio information of the adjustment video clip is collected and the corresponding time point is recorded. When the TV is equipped with an external device such as an external microphone for playback, the recording can be collected through an external device, and the collection time can be recorded, and the collected information can be sent to the TV for processing, or other methods can also be used.

Operation S300, comparing the audio information of the adjustment video clip and the time point corresponding to the audio information with a standard video in the preset video database, and determining whether there is a synchronization delay between the sound and the picture.

After obtaining the audio information of the adjustment video clip and the corresponding time point, the audio information of the adjustment video clip and the corresponding time point can be compared with the standard video in the preset video database to determine whether there is a synchronization delay between the sound and the picture. Specially, the audio information of the adjustment video clip is compared with the sound of the standard video in the preset video database to find the corresponding sound. Then the time when the sound appeared in the film source is compared with the time the video was played when the sound was collected to determine whether there is the synchronization delay between the sound and the picture. If the two match, there is no synchronization delay between the sound and the picture; if the two do not match, there is the synchronization delay between the sound and the picture.

If there is the synchronization delay between the sound and the picture, perform operation S400, synchronizing the sound and the picture of the video.

If there is the synchronization delay between the sound and the picture, the sound and the picture of the video should be synchronized. TV automatically adjusts to synchronize the sound and picture of the video. In this embodiment, TV can automatically adjust the power amplifier adapted to the TV speaker, and also automatically adjust the adapted Bluetooth speaker and other equipment. Compared with the user's subjective judgment and then setting the delay on the UI, it has the characteristics of high accuracy and convenient operation, and does not affect the user experience.

The present disclosure provides a method and a device for automatically adjusting synchronization of sound and picture of TV, and a computer readable storage medium. The method includes: obtaining a video, and determining whether the video contains an adjustment video clip corresponding to a preset video database; obtaining audio information of the adjustment video clip and a time point corresponding to the audio information if the video contains the adjustment video clip corresponding to the preset video database; comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the sound and the picture. As such, when playing a specific adjustment video clip, the adjustment video clip is compared with the preset database. According to the comparison result, the synchronization of the sound and the picture of the video are automatically adjusted without the user's perception, which improves the user's viewing experience, without the user's subjective interaction and repeated adjustments, and has high adjustment accuracy.

Figure 3:
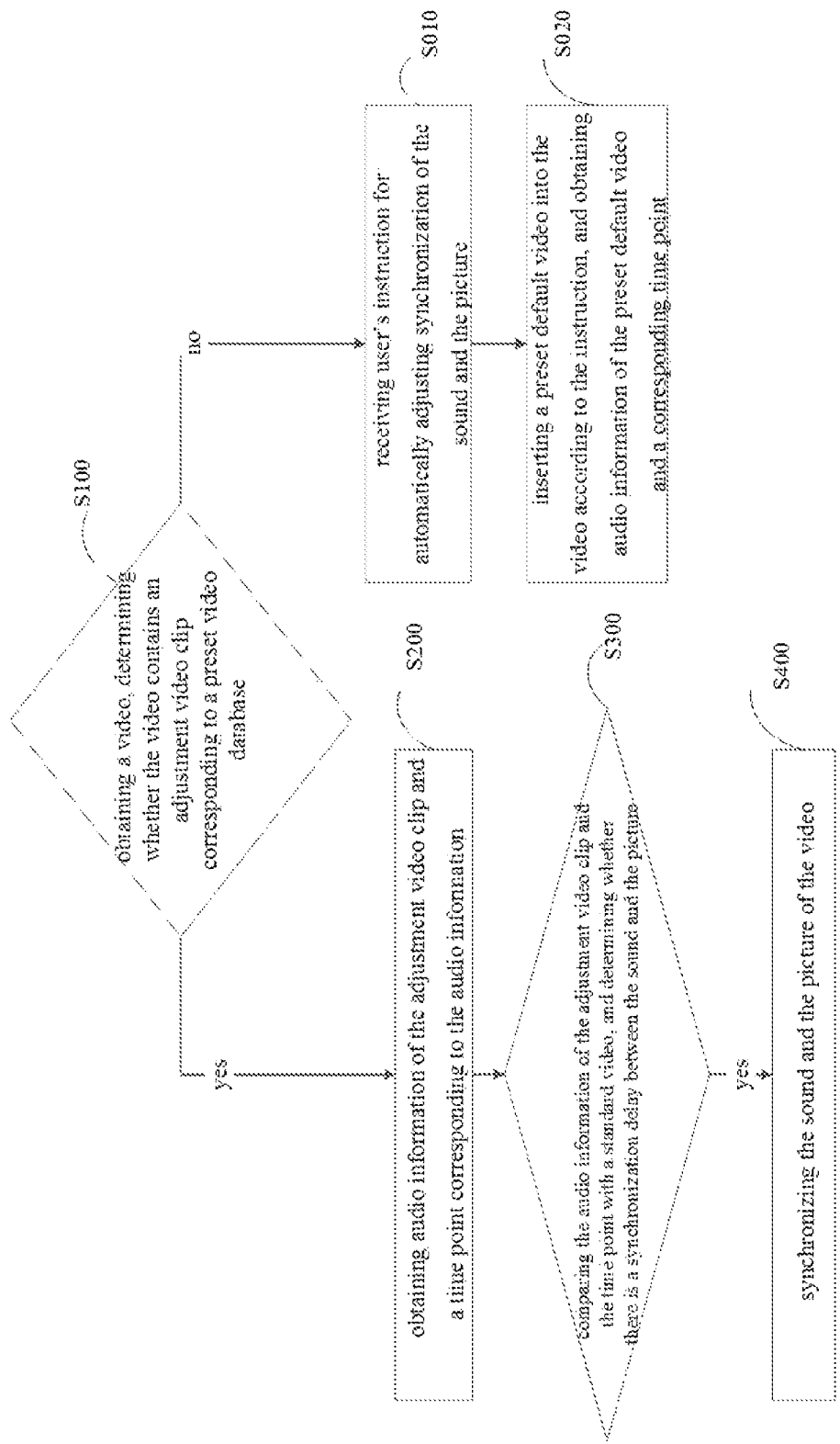
FIG. 3 is a schematic flow diagram of the method for automatically adjusting synchronization of sound and picture of TV according to a second embodiment of the present disclosure.

As shown in FIG. 3, FIG. 3 is a schematic flow diagram of the method for automatically adjusting synchronization of sound and picture of TV according to a second embodiment of the present disclosure.

Based on the above embodiment, in this embodiment, after the operation S100, the method further includes:

If the video does not contain the adjustment video clip corresponding to the preset video database, perform operation S010, receiving user's instruction for automatically adjusting synchronization of the sound and the picture.

If the video does not contain the adjustment video clip corresponding to the preset video database, it can be adjusted through the user's adjustment instruction, and receives the user's instruction for automatically adjusting synchronization of the sound and the picture. The instruction can be issued by the user pressing a button, or by a voice instruction of the user, or can also be issued in other ways.

Operation S020, inserting a preset default video into the video according to the instruction, and obtaining audio information of the preset default video and a corresponding time point.

After receiving the instruction for automatically adjusting synchronization of the sound and the picture according to the user's wishes, the preset default video can be inserted into the video according to the received instruction, and the audio information of the preset default video and the corresponding time point can be obtained. The audio information of the default video and the corresponding time point are compared with the standard video in the preset video database to synchronize the sound and the picture of the video. The preset default video is a video clip preset by the system for the user to perform sound and the picture synchronization when the user does not recognize a specific adjustment video clip. It is possible to automatically adjust the sound and picture out of synchronization due to the playback delay of the external device without the specific adjustment video clip through the video clip, especially for the speaker system of wireless transmission such as Bluetooth with longer delay. In this embodiment, according to the user's wishes, automatically adjusting synchronization of sound and picture of TV is performed by the user manually activated once.

Figure 4:
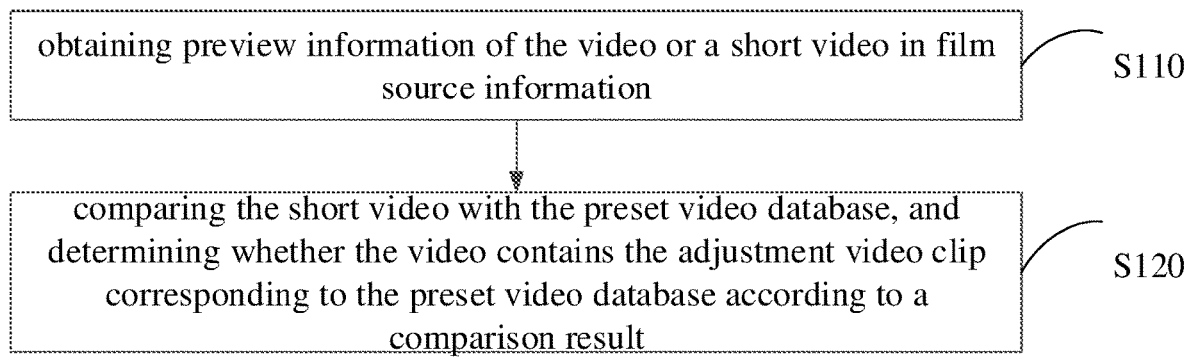
FIG. 4 is a schematic flow diagram of the method for automatically adjusting synchronization of sound and picture of TV according to a third embodiment of the present disclosure.

As shown in FIG. 4, FIG. 4 is a schematic flow diagram of the method for automatically adjusting synchronization of sound and picture of TV according to a third embodiment of the present disclosure.

Based on the above embodiments, in this embodiment, the operation S100 includes:

Operation S110, obtaining preview information of the video or a short video in film source information.

In this embodiment, the video is obtained, and whether the video contains the adjustment video clip corresponding to the preset video database is determined, the preview information of the video or the short video in the film source information may be first obtained. In the network video playback system, generally there will be a short video in the introduction stage of the movie, that is, the preview information or the film source information, for the user's reference. Therefore, the preview information of the video or a short video in the film source information is obtained.

Operation S120, comparing the short video with the preset video database, and determining whether the video contains the adjustment video clip corresponding to the preset video database according to a comparison result.

After obtaining the preview information of the video or the short video in the film source information, the short video is compared with the preset video database, and whether the video contains the adjustment video clip corresponding to the preset video database is determined according to the comparison result. According to the comparison result, if it exists, it is determined that the video contains the adjustment video clip corresponding to the preset video database; if it does not exist, it is determined that the video does not contain the adjustment video clip corresponding to the preset video database.

Figure 5:
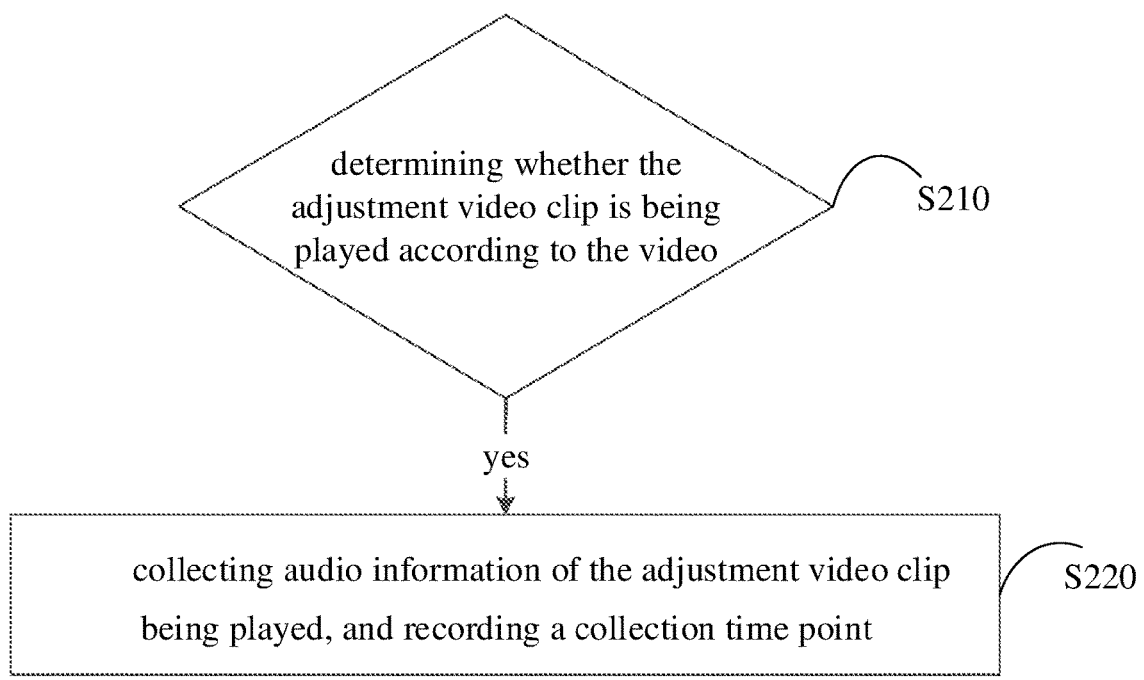
FIG. 5 is a schematic flow diagram of the method for automatically adjusting synchronization of sound and picture of TV according to a fourth embodiment of the present disclosure.

As shown in FIG. 5, FIG. 5 is a schematic flow diagram of the method for automatically adjusting synchronization of sound and picture of TV according to a fourth embodiment of the present disclosure.

Based on the above embodiments, in this embodiment, the operation S200 includes:

Operation S210, determining whether the adjustment video clip is being played according to the video.

In this embodiment, the audio information of the adjustment video clip and the corresponding time point can be obtained when the video is playing the adjustment video clip. Whether the video is playing the adjustment video clip is determined.

If the adjustment video clip is being played, perform operation S220, collecting audio information of the adjustment video clip being played and recording a collection time point.

If the adjustment video clip is being played, the audio information of the adjustment video clip being played is collected and the collection time point is recorded. Specially, the corresponding adjustment video clip can be played. The audio information of the adjustment video clip is collected and the corresponding time point is recorded. When the TV is equipped with an external device such as an external microphone for playback, the recording can be collected through an external device, and the collection time can be recorded, and the collected information can be sent to the TV for processing, or other methods can also be used.

Figure 6:
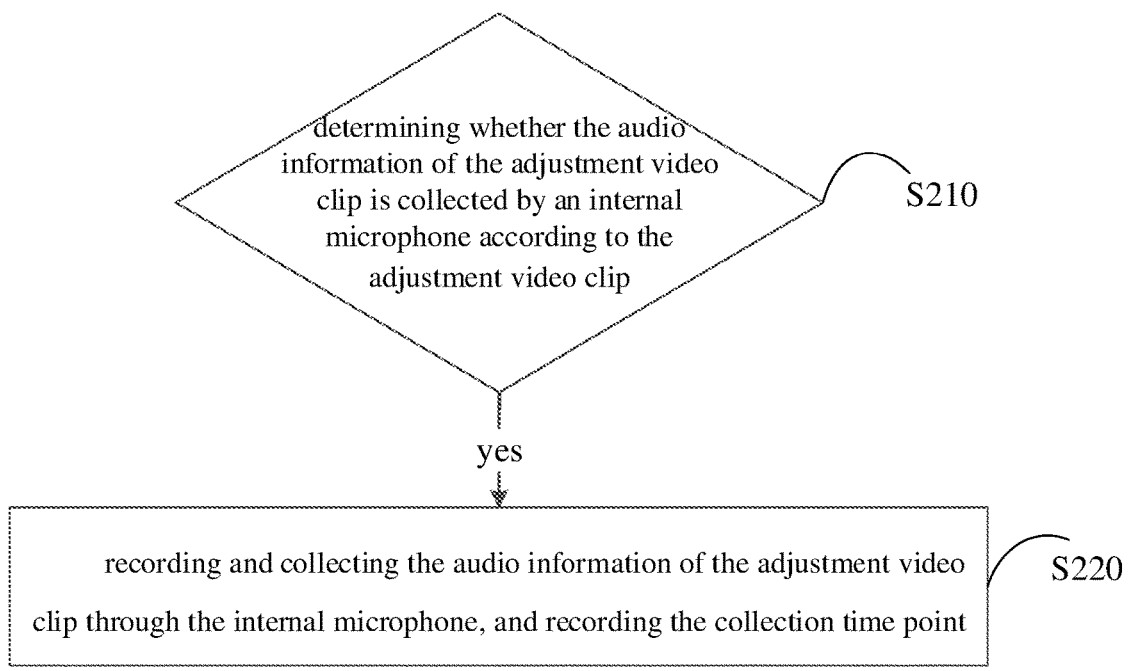
FIG. 6 is a schematic flow diagram of the method for automatically adjusting synchronization of sound and picture of TV according to a fifth embodiment of the present disclosure.

As shown in FIG. 6, FIG. 6 is a schematic flow diagram of the method for automatically adjusting synchronization of sound and picture of TV according to a fifth embodiment of the present disclosure.

Based on the above embodiments, in this embodiment, the operation S220 includes:

Operation S221, determining whether the audio information of the adjustment video clip is collected by an external microphone according to the adjustment video clip.

In this embodiment, the audio information of the adjustment video clip being played is collected, and the collection time point is recorded. It can be determined according to the adjustment video clip whether the audio information of the adjustment video clip is collected through an external microphone.

If the audio information of the adjustment video clip is collected by the external microphone, perform operation S222, recording and collecting the audio information of the adjustment video clip through the external microphone, and recording the collection time point.

If the audio information of the adjustment video clip is collected by the external microphone, the audio information of the adjustment video clip is recorded and collected through the external microphone, and the collection time point is recorded.

The external microphone may be an external microphone connected through Bluetooth, or an external microphone connected through WIFI, or an external microphone connected through other methods wired or wireless.

In another embodiment, the operation of collecting audio information of the adjustment video clip being played, and recording a collection time point includes:

determining whether the audio information of the adjustment video clip is collected by an internal microphone according to the adjustment video clip;

recording and collecting the audio information of the adjustment video clip through the internal microphone, and recording the collection time point, if the audio information of the adjustment video clip is collected by the internal microphone; and recording and collecting the audio information of the adjustment video clip through an external microphone, and recording the collection time point, if the audio information of the adjustment video clip is not collected by the internal microphone.

Figure 7:
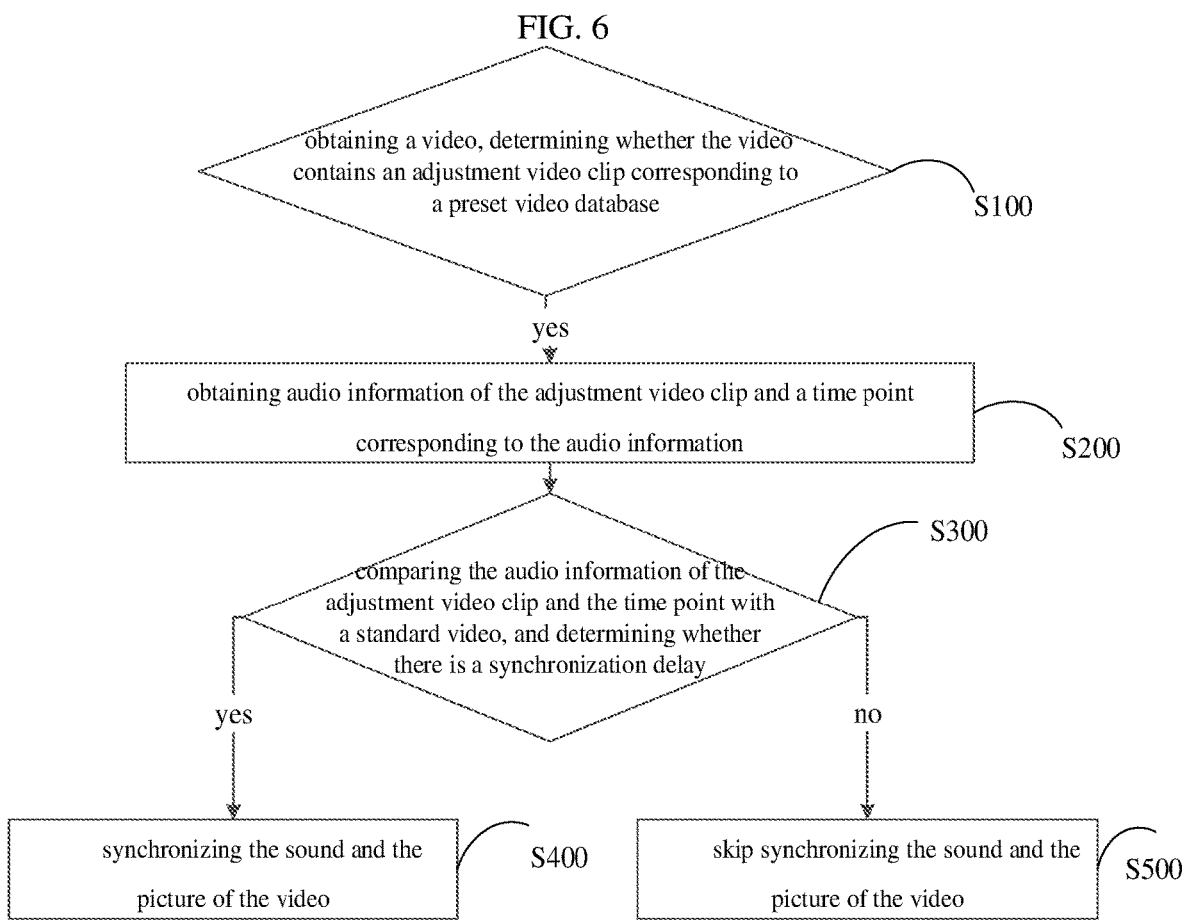
FIG. 7 is a schematic flow diagram of the method for automatically adjusting synchronization of sound and picture of TV according to a sixth embodiment of the present disclosure.

As shown in FIG. 7, FIG. 7 is a schematic flow diagram of the method for automatically adjusting synchronization of sound and picture of TV according to a sixth embodiment of the present disclosure.

Based on the above embodiments, in this embodiment, after the operation S300, the method further includes:

If there is no synchronization delay between the sound and the picture, perform operation S500, skipping to synchronize the sound and the picture of the video.

In this embodiment, if the audio information of the adjustment video clip and the corresponding time point are compared with the corresponding standard video in the preset video database, and it is determined that there is no synchronization delay between the sound and the picture, then there is no need to synchronize the sound and the picture of the video, just keep the existing audio-visual playback effect.

Figure 8:
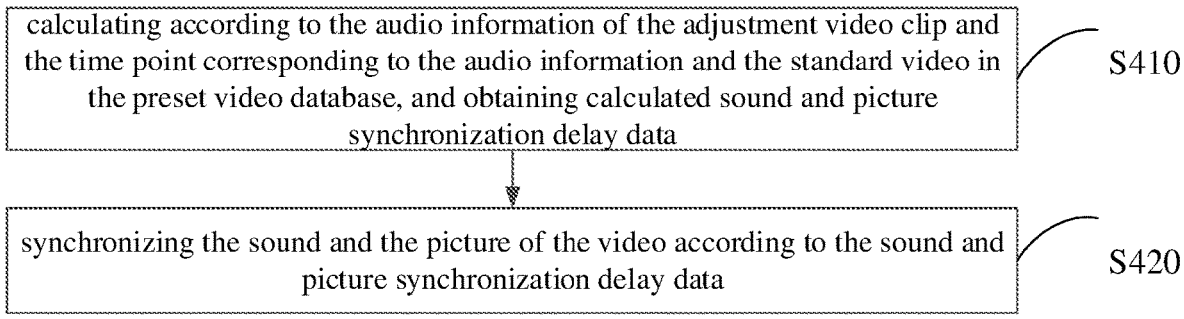
FIG. 8 is a schematic flow diagram of the method for automatically adjusting synchronization of sound and picture of TV according to a seventh embodiment of the present disclosure.

As shown in FIG. 8, FIG. 8 is a schematic flow diagram of the method for automatically adjusting synchronization of sound and picture of TV according to a seventh embodiment of the present disclosure.

Based on the above embodiments, in this embodiment, the operation S400 includes:

Operation S410, calculating according to the audio information of the adjustment video clip and the time point corresponding to the audio information and the standard video in the preset video database, and obtaining calculated sound and picture synchronization delay data.

In this embodiment, before synchronizing the sound and the picture of the video, first calculating according to the audio information of the adjustment video clip and the time point corresponding to the audio information and the standard video in the preset video database, and obtaining calculated sound and picture synchronization delay data. Specially, the audio matching the corresponding standard video in the video database is searched in the specific adjustment video clip of the background, and the time point is read. Then, the calculated sound and picture synchronization delay data is obtained by adjusting the comparison between the two time points of the video clip and the standard video.

Operation S420, synchronizing the sound and the picture of the video according to the sound and picture synchronization delay data.

After obtaining the calculated sound and picture synchronization delay data, the sound and the picture of the video are synchronized according to the sound and picture synchronization delay data.

Figure 9:
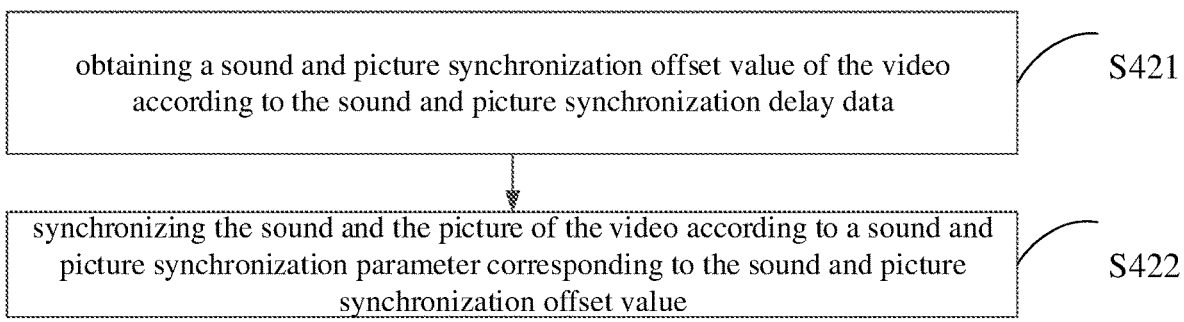
FIG. 9 is a schematic flow diagram of the method for automatically adjusting synchronization of sound and picture of TV according to an eighth embodiment of the present disclosure.

As shown in FIG. 9, FIG. 9 is a schematic flow diagram of the method for automatically adjusting synchronization of sound and picture of TV according to an eighth embodiment of the present disclosure.

Based on the above embodiments, in this embodiment, the operation S420 includes:

Operation S421, obtaining a sound and picture synchronization offset value of the video according to the sound and picture synchronization delay data.

In this embodiment, according to the comparison of the two time points of the adjustment video clip and the standard video, the self-tuning value of sound and picture synchronization, that is, the sound and picture synchronization offset value of the video, can be obtained. The sound and picture offset value can reflect the delay of sound and picture synchronization.

Operation S422, synchronizing the sound and the picture of the video according to a sound and picture synchronization parameter corresponding to the sound and picture synchronization offset value.

After obtaining the sound and picture synchronization offset value, the sound and the picture of the video are synchronized according to the sound and picture synchronization parameter corresponding to the sound and picture synchronization offset value.

In this embodiment, a sound of the current video or the source-specific start video is collected through the external microphone that comes with the TV or the TV is adapted to. Then the sound is compared with the time point of the sound in the specific start video that comes with the database to obtain the sound and picture synchronization offset value, so as to achieve the purpose of automatically adjusting synchronization of sound and picture, and improve user experience.

Besides, the present disclosure further provides a computer readable storage medium.

The computer readable storage medium of the present disclosure stores a program for automatically adjusting synchronization of sound and picture of TV, the program, when executed by a processor, performs the operations of the method for automatically adjusting synchronization of sound and picture of TV.

The method implemented when the program for automatically adjusting synchronization of sound and picture of TV running on the processor is executed refers to the various embodiments of the method for automatically adjusting synchronization of sound and picture of TV of the present disclosure, which will not be repeated here.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as a ROM/RAM, a magnetic disk, an optical disk) as described above, including several instructions to cause a terminal device (which can be a mobile phone, a computer, a server, an air conditioner, or a network device, etc.) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for automatically adjusting synchronization of sound and picture of TV, comprising the following operations:

obtaining a video, and determining whether the video contains an adjustment video clip corresponding to a preset video database;

obtaining audio information of the adjustment video clip and a time point corresponding to the audio information if the video contains the adjustment video clip corresponding to the preset video database;

comparing the audio information of the adjustment video clip and the time point corresponding to the audio information with a standard video in the preset video database, and determining whether there is a synchronization delay between the sound and the picture; and synchronizing the sound and the picture of the video if there is the synchronization delay between the sound and the picture;

wherein after the operation of obtaining a video, and determining whether the video contains an adjustment video clip corresponding to a preset video database, the method further comprises:

receiving a user's instruction for automatically adjusting synchronization of the sound and the picture if the video does not contain the adjustment video clip corresponding to the preset video database; and inserting a preset default video into the video according to the instruction, and obtaining audio information of the preset default video and a corresponding time point.

2. The method for automatically adjusting synchronization of sound and picture of TV of claim 1, wherein the operation of obtaining a video, and determining whether the video contains an adjustment video clip corresponding to a preset video database comprises:

obtaining preview information of the video or a short video in film source information; and comparing the short video with the preset video database, and determining whether the video contains the adjustment video clip corresponding to the preset video database according to a comparison result.

3. The method for automatically adjusting synchronization of sound and picture of TV of claim 1, wherein the operation of obtaining audio information of the adjustment video clip and a time point corresponding to the audio information comprises:

determining whether the adjustment video clip is being played according to the video; and collecting audio information of the adjustment video clip being played, and recording a collection time point, if the adjustment video clip is being played.

4. The method for automatically adjusting synchronization of sound and picture of TV of claim 3, wherein the operation of collecting audio information of the adjustment video clip being played, and recording a collection time point comprises:

determining whether the audio information of the adjustment video clip is collected by an external microphone according to the adjustment video clip; and recording and collecting the audio information of the adjustment video clip through the external microphone, and recording the collection time point, if the audio information of the adjustment video clip is collected by the external microphone.

5. The method for automatically adjusting synchronization of sound and picture of TV of claim 3, wherein the operation of collecting audio information of the adjustment video clip being played, and recording a collection time point comprises:

determining whether the audio information of the adjustment video clip is collected by an internal microphone according to the adjustment video clip;

recording and collecting the audio information of the adjustment video clip through the internal microphone, and recording the collection time point, if the audio information of the adjustment video clip is collected by the internal microphone; and recording and collecting the audio information of the adjustment video clip through an external microphone, and recording the collection time point, if the audio information of the adjustment video clip is not collected by the internal microphone.

6. The method for automatically adjusting synchronization of sound and picture of TV of claim 1, wherein the operation of comparing the audio information of the adjustment video clip and the time point corresponding to the audio information with a standard video in the preset video database, and determining whether there is a synchronization delay between the sound and the picture further comprises:

skipping to synchronize the sound and the picture of the video if there is no synchronization delay between the sound and the picture.

7. The method for automatically adjusting synchronization of sound and picture of TV of claim 1, wherein the operation of synchronizing the sound and the picture of the video comprises:

calculating according to the audio information of the adjustment video clip and the time point corresponding to the audio information and the standard video in the preset video database, and obtaining calculated sound and picture synchronization delay data; and synchronizing the sound and the picture of the video according to the sound and picture synchronization delay data.

8. The method for automatically adjusting synchronization of sound and picture of TV of claim 7, wherein the operation of synchronizing the sound and the picture of the video according to the sound and picture synchronization delay data comprises:
  obtaining a sound and picture synchronization offset value of the video according to the sound and picture synchronization delay data; and
  synchronizing the sound and the picture of the video according to a sound and picture synchronization parameter corresponding to the sound and picture synchronization offset value.

9. A device for automatically adjusting synchronization of sound and picture of TV, wherein the device comprises a memory, a processor, and a program for automatically adjusting synchronization of sound and picture of TV stored in the memory and executed by the processor, the program, when executed by the processor, performs the method for automatically adjusting synchronization of sound and picture of TV of claim 1.

10. A non-transitory computer readable storage medium, wherein the non-transitory computer readable storage medium stores a program for automatically adjusting synchronization of sound and picture of TV, the program, when executed by a processor, performs the method for automatically adjusting synchronization of sound and picture of TV of claim 1.

* * * * *